United States Patent [19]

Kimura et al.

[11] Patent Number: 4,873,441

[45] Date of Patent: Oct. 10, 1989

[54] METHOD OF AND APPARATUS FOR RECORDING AND READING OUT RADIATION IMAGE INFORMATION

[75] Inventors: Tsutomu Kimura; Yukio Watanabe, both of Kanagawa, Japan

[73] Assignee: Fuji Photo Film Co., Ltd., Kanagawa, Japan

[21] Appl. No.: 102,999

[22] Filed: Sep. 30, 1987

Related U.S. Application Data

[62] Division of Ser. No. 793,009, Oct. 30, 1985.

[30] Foreign Application Priority Data

Oct. 30, 1984 [JP] Japan ............................ 59-228747
Oct. 30, 1984 [JP] Japan ............................ 59-228748
Oct. 30, 1984 [JP] Japan ............................ 59-228749

[51] Int. Cl.$^4$ .......................................... G01N 23/04
[52] U.S. Cl. .............................................. 250/327.2
[58] Field of Search ........................ 250/484.1, 327.2

[56] References Cited

U.S. PATENT DOCUMENTS

4,546,250 10/1985 Horikawa et al. .................. 250/572
4,603,253 7/1986 Nakagawa ...................... 250/327.20
4,684,592 8/1987 Matsuda et al. .................... 250/337

FOREIGN PATENT DOCUMENTS

165641 8/1985 Japan ............................ 250/327.24

Primary Examiner—Carolyn E. Fields
Attorney, Agent, or Firm—Sughrue, Mion, Zinn, Macpeak & Seas

[57] ABSTRACT

An apparatus for recording and reading out radiation image information including a circulatory feed system for feeding stimulable phosphor sheets. Prior to successive recording of images on the stimulable phosphor sheets, any remaining images and dust are erased from the sheets, and the sheets are checked for defects or scratches thereon. Any sheet bearing such a defect is controlled to skip image recording, readout, and erasing steps. The frequency of erasing the remaining image on a stimulable sheet in the erasing step is controlled dependent on the amount of the radiation to which the object is exposed.

8 Claims, 11 Drawing Sheets

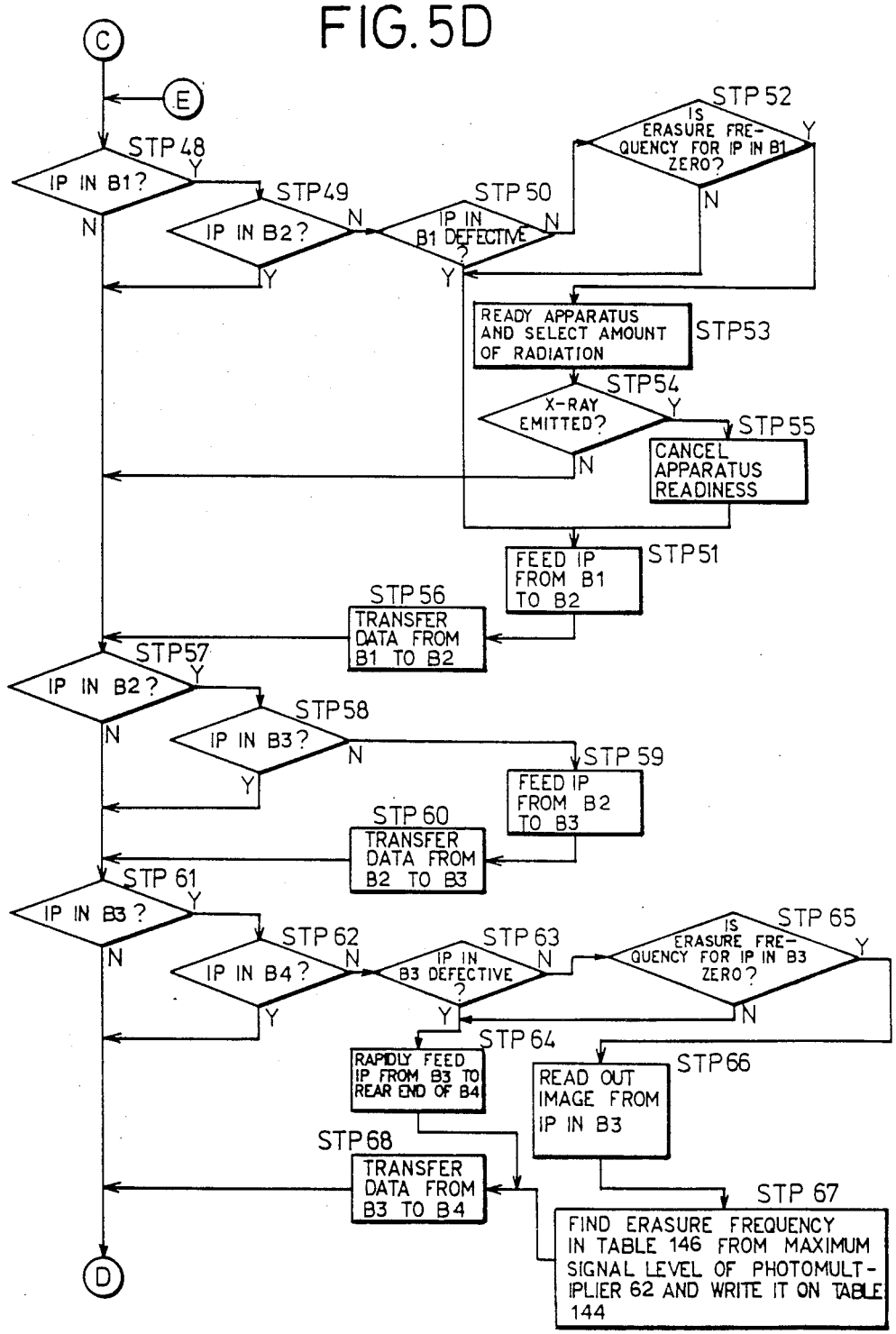

FIG.7A

| BLOCK POSITION | SHEET NO. |
|---|---|
| B 1 | 26a |
| B 2 | 26b |
| B 3 | × |
| B 4 | 26c |
| B 5 | × |
| B 6 | 26d |
| B 7 | × |

| BLOCK POSITION | SHEET NO. | DEFECT |
|---|---|---|
| B 1 | 26a | 1 0 0 1 |
| B 2 | 26b | 0 0 1 0 |
| B 3 | × | |
| B 4 | 26c | 0 1 0 0 |
| B 5 | × | |
| B 6 | 26d | 0 0 0 1 |
| B 7 | × | |

| SHEET NO. | ERASURE FREQUENCY |
|---|---|
| 26a | 0 |
| 26b | 3 |
| 26c | 0 |
| 26d | 1 |

←— 144c

METHOD OF AND APPARATUS FOR RECORDING AND READING OUT RADIATION IMAGE INFORMATION

This is a division of application Ser. No. 793,009 filed 10/30/85.

BACKGROUND OF THE INVENTION

The present invention relates to a method of and an apparatus for recording and reading out radiation image information, and more particularly to such a method of and an apparatus for recording the radiation image information of an object on a stimulable phosphor sheet and detecting light emitted from the stimulable phosphor sheet and representative of the recorded image information by applying stimulating light to the stimulable phosphor sheet, thereby to read the image information, and for converting the same into an electric signal.

When a certain phosphor is exposed to a radiation such as X-rays, $\alpha$-rays, $\beta$-rays, $\gamma$-rays, cathode rays, or ultraviolet rays, the phosphor stores a part of the energy of the radiation. When the phosphor exposed to the radiation is exposed to stimulating rays such as visible light, the phosphor emits light in proportion to the stored energy of the radiation. The phosphor exhibiting such a property is referred to as a "stimulable phosphor".

There has been proposed a radiation image recording and readout system employing such a stimulable phosphor. More specifically, the radiation image of an object such as a human body is stored in a sheet of stimulable phosphor (hereinafter referred to as a "stimulable phosphor sheet" or a "phosphor sheet"), and then the stimulable phosphor sheet is scanned with stimulating rays to cause the stimulable phosphor sheet to emit light representative of the radiation image. The emitted light is then photoelectrically detected to produce an image information signal that is electrically processed for generating image information suitable for diagnostic purpose. The aforesaid radiation image recording and readout system is disclosed in U.S. Pat. No. 4,258,264, Japanese Laid-Open Patent Publication Nos. 55-116340, 55-163472, 56-11395, and 56-104645, for example.

The image which is finally produced can be reproduced as a hard copy, or displayed on a display unit such as a CRT, or recorded on a recording medium such as a magnetic tape for storage over a long period of time. At any rate, the stimulable phosphor sheet does not serve as a final image recording medium, but as a temporary image storage medium for eventually transferring images to the other recording medium or display unit. Therefore, the stimulable phosphor sheet can be used repeatedly, and is highly economical and convenient if in repetitive use.

The radiation image recording and readout apparatus may be installed in a mobile station such as an X-ray photographing unit car, and the mobile station may be set to various places for taking X-ray photographs of a group of people for diagnostic purpose. However, it would be inconvenient for the mobile station to carry many stimulable phosphor sheets, and the number of stimulable phosphor sheets that can be carried on the mobile station or car is limited. It is therefore desirable to carry a reusable stimulable phosphor sheet on the mobile station for recording the radiation image of each object and to store the image signals on a mass storage medium such as a magnetic tape, while the stimulable phosphor sheet is cyclically reused by successively recording and erasing the radiation images. In this manner, the radiation images of many objects or people can be taken on the mobile station within a limited space available. By cyclically reusing the stimulable phosphor sheet, radiation images can successively be taken at an increased speed, so that the images of a group of people can quickly and efficiently be recorded for diagnostic purpose.

To reuse the stimulable phosphor sheet, the remaining radiation energy on the stimulable phosphor sheet after the radiation image has been read out by stimulating rays is discharged by exposure to light or heat, and the stimulable phosphor sheet is employed again for recording a radiation image thereon. The erasure of the irradiation energy from the stimulable phosphor sheet is disclosed in U.S. Pat. No. 4,400,619 and Japanese Laid-Open Patent Publication No. 56-12599, for example.

The applicant has proposed a built-in radiation image recording and readout apparatus (as disclosed in Japanese Patent Application No. 58-66730) which has circulatory feed means for feeding a stimulable phosphor sheet along a circulatory path, an image recording unit disposed in the circulatory path for exposing the sheet to a radiation through an object to record a radiation image on the sheet, an image readout unit disposed in the circulatory path and having a stimulating light source for emitting stimulating light to scan the sheet with the radiation image recorded thereon and photoelectric readout means for detecting light emitted from the sheet scanned by the stimulating light to produce an image signal, and an image erase unit disposed in the circulatory path for discharging remaining radiation energy from the sheet after the image has been read by the image readout unit and before a new radiation image is recorded on the sheet by the image recording unit, the stimulable phosphor sheet being cyclically movable through the units for reuse.

The radiation image recording and readout apparatus of the above arrangement is advantageous in that it can successively and efficiently record and read out radiation image information.

However, in the event that the reusable stimulable phosphor sheet suffers from any surface defect, radiation image information produced therefrom by the image readout unit may be inaccurate, and a doctor may make a wrong diagnosis based on the reproduced image if the imaged object is a patient. Therefore, it is preferable to remove such any surface defect from the stimulable phosphor sheet as soon as possible while the sheet is in cyclic use, or to avoid the use of the sheet, or to replace the stimulable phosphor sheet with another normal stimulable phosphor sheet.

One example of such a surface defect is a scratch on the stimulable phosphor sheet, which prevents a radiation image to be properly recorded on the stimulable phosphor sheet. Any trace of a remaining image or accumulated environmental radiation on a stimulable phosphor sheet as a result of nonuse of the sheet for a long period of time is also responsible for the prevention of a radiation image from being properly recorded on the sheet. When a stimulable phosphor sheet is exposed to a large amount of radiation, any remaining radiation image thereon is so strong as to be detectable as noise, which prevents accurate image information from being produced.

Where there is a scratch on a stimulable phosphor sheet, it is normally removed or the stimulable phosphor sheet is replaced with a new one by a supervisor of the radiation image recording and readout apparatus. The radiation image recording and readout apparatus tends to be less frequently attended by its supervisor, and should no supervisor be available immediately, the scratched stimulable phosphor sheet cannot be removed from the circulatory process at a desired time. The radiation image recording and readout apparatus on the mobile station for taking radiation images of a group of people for diagnostic purpose is more likely to be unattended by its supervisor. Consequently, it is the current practice to reuse a stimulable phosphor sheet, regardless of whether it is scratched or not, in the circulatory feed cycle through the image recording, readout, and erase steps in such system.

Any radiation image information obtained from a defective stimulable phosphor sheet is not accurate enough to be used as proper image information, and hence the image recording, readout, and erase steps effected on such a defective stimulable phosphor sheet may entirely be useless.

Even if there is no scratch on a stimulable phosphor sheet, the sheet may undergo the following problem: After the stimulable phosphor sheet is exposed to erasing light to remove a remaining image therefrom, it may be left unused for a long period of time such as when all image information for one day has been recorded. Then, a trace of radiation energy which may have not been discharged from the sheet by exposure to the erasing light will emerge as a remaining image with time. Radiation energy can also be stored in the sheet by cosmic rays and environmental radiations from another X-ray source. If the remaining image and the energy is thus stored in the sheet while the sheet is left unused for a long time, it is produced as noise when the sheet is reused to record radiation image information. As a consequence, no correct radiation image of an object can be obtained from such stimulable phosphor sheet.

The erase unit of the radiation image recording and readout system serves to emit light or heat toward the stimulable phosphor sheet for thereby causing the sheet to discharge remaining radiation energy. In order to allow the stimulable phosphor sheet to be reusable, the sheet is required to be exposed to more and more light or heat as the remaining radiation energy is greater since the amount of discharged remaining radiation energy is proportional to the amount of erasing light or heat to which the sheet is exposed. Therefore, the amount of erasing light or heat produced in the erase unit is selected to be large enough to discharge the normally expected maximum quantity of remaining radiation energy substantially thoroughly (or to the extent which will not obstruct the next cycle of image recording) from the stimulable phosphor sheet. The amount of erasing light or heat may be controlled dependent on the magnitude of the remaining radiation energy on the sheet with a view to reducing the energy and time required to erase the remaining image. Even in such a case, the maximum controlled amount of erasing light or heat is selected to be sufficiently large to discharge the normally expected maximum quantity of remaining radiation energy substantially thoroughly from the stimulable phosphor sheet.

In taking certain special radiation images, a stimulable phosphor sheet may be exposed to a far greater amount of radiation than normal. The remaining radiation energy on the sheet exposed to such a large amount of radiation may often exceed a normal maximum value after the image has been read from the sheet. When such stimulable phosphor sheet is delivered into the erase unit, it is desirable to expose the sheet to erasing light or heat for a longer interval of time to permit the sheet to be reused for image recording.

In the event that the stimulable phosphor sheet is exposed to erasing light or heat for a longer time for the removal of remaining radiation energy, however, the travel of the sheet has to be arrested in the erase unit, and the image recording and readout steps have to be interrupted.

If the longer time were not consumed for erasing the remaining radiation energy from the sheet, then the remaining radiation energy would tend to be left, and a new radiation image would be recorded on the sheet over the remaining radiation energy. Consequently, the new radiation image recorded on the sheet would not be available as accurate image information.

SUMMARY OF THE INVENTION

It is an object of the present invention to provide a method of and an apparatus for recording and reading out radiation image information, in which when a stimulable phosphor sheet contains a defect which will prevent normal radiation image information from being recorded therein, the stimulable phosphor sheet can be kept away from image recording, readout, and erasing steps until the defect is removed or the sheet is replaced with another stimulable phosphor sheet.

Another object of the present invention is to provide a method of and an apparatus for recording and reading out radiation image information, in which any scratched reusable stimulable phosphor sheet can be guided out of use without being subject to image recording, readout, and erasing steps, and remaining reusable stimulable phosphor sheets can be used for efficiently and accurately producing radiation image information of an object.

Still another object of the present invention is to provide an apparatus for recording and reading out radiation image information, in which when a stimulable phosphor sheet that has been left unused for a certain period of time is to be used again for recording radiation image information, the sheet is subject to an image erasing step to erase any remaining image therefrom and is preferably cleaned to remove dust or other foreign matter from the surface thereof for allowing accurate radiation image information to be recorded thereon and reproduced therefrom.

A still further object of the present invention is to provide an apparatus for recording and reading out radiation image information, in which when a reusable stimulable sheet is exposed to a much larger amount of radiation than normal and any remaining radiation energy left on the sheet after the radiation image has been read therefrom is in excess of a prescribed level, the stimulable phosphor sheet is first subject to an image erasing step several times to erase the remaining radiation image substantially thoroughly, and the used to record a new radiation image and reproduce the recorded image, so that the speed of the image recording, readout, and erasing processes can be increased and accurate radiation image information of an object can be obtained.

Still another object of the present invention is to provide a method of recording and reading out radiation image information, comprising the steps of feeding stimulable phosphor sheets each capable of recording radiation image information along a predetermined circulatory feed path, exposing the stimulable phosphor sheets to a radiation through an object to record the radiation image information of the object on the stimulable phosphor sheets in an image recording unit in the circulatory feed path, reading out the radiation image information from the stimulable phosphor sheets in an image readout unit in the circulatory feed path, erasing any remaining image from the stimulable phosphor sheets in an image erase unit in the circulatory feed path, and subjecting all of the stimulable phosphor sheets employed for recording radiation image information thereon to the erasing step at least once before radiation image information is successively recorded on the stimulable phosphor sheets.

A still further object of the present invention is to provide a method of recording and reading out radiation image information, comprising the steps of feeding stimulable phosphor sheets each capable of recording radiation image information along a predetermined circulatory feed path, exposing the stimulable phosphor sheets to a radiation through an object to record the radiation image information of the object on the stimulable phosphor sheets in an image recording unit in the circulatory feed path, reading out the radiation image information from the stimulable phosphor sheets in an image readout unit in the circulatory feed path, erasing any remaining image from the stimulable phosphor sheets in an image erase unit in the circulatory feed path, and exposing the stimulable phosphor sheets to stimulating light to detect any defect thereon before radiation image information is successively recorded on the stimulable phosphor sheets, and feeding those stimulable phosphor sheets which bear defects through the circulatory feed path while skipping the image recording, reading, and erasing steps.

A yet still further object of the present invention is to provide a method of recording and reading out radiation image information, comprising the steps of feeding stimulable phosphor sheets each capable of recording radiation image information along a predetermined circulatory feed path, exposing the stimulable phosphor sheets to a radiation through an object to record the radiation image information of the object on the stimulable phosphor sheets in an image recording unit in the circulatory feed path, reading out the radiation image information from the stimulable phosphor sheets in an image readout unit in the circulatory feed path, erasing any remaining image from the stimulable phosphor sheets in an image erase unit in the circulatory feed path, selecting the frequency of erasing any remaining image from the stimulable phosphor sheet based on the amount of light emitted therefrom dependent on the amount of the radiation from a radiation source, and preventing the radiation image information from being recorded on the stimulable phosphor sheet until the frequency reaches a prescribed value.

Still another object of the present invention is to provide an apparatus for recording and reading out radiation image information, comprising circulatory feed means for feeding stimulable phosphor sheets each capable of recording radiation image information along a predetermined circulatory feed path, an image recording unit disposed in the circulatory feed path for exposing the stimulable phosphor sheets to a radiation through an object to record the radiation image information of the object on the stimulable phosphor sheets, an image readout unit disposed in the circulatory feed path and having a stimulating light source for emitting stimulating light to scan the stimulable phosphor sheets with the radiation image information recorded thereon and photoelectric readout means for detecting light emitted from the stimulable phosphor sheets scanned by the stimulating light to produce image signals, an image erase unit disposed in the circulatory feed path for discharging remaining radiation energy from the stimulable phosphor sheets after the images have been read therefrom by the image readout unit and before new radiation images are recorded on the stimulable phosphor sheets by the image recording unit, and control means for subjecting the stimulable phosphor sheets to operation of the image erase unit before radiation image information is recorded thereon and read out thereof prior to operation of the apparatus.

A still further object of the present invention is to provide an apparatus for recording and reading out radiation image information, comprising circulatory feed means for feeding stimulable phosphor sheets each capable of recording radiation image information along a predetermined circulatory feed path, an image recording unit disposed in the circulatory feed path for exposing the stimulable phosphor sheets to a radiation through an object to record the radiation image information of the object on the stimulable phosphor sheets, an image readout unit disposed in the circulatory feed path and having a stimulating light source for emitting stimulating light to scan the stimulable phosphor sheets with the radiation image information recorded thereon and photoelectric readout means for detecting light emitted from the stimulable phosphor sheets scanned by the stimulating light to produce image signals, an image erase unit disposed in the circulatory feed path for discharging remaining radiation energy from the stimulable phosphor sheets after the images have been read therefrom by the image readout unit and before new radiation images are recorded on the stimulable phosphor sheets by the image recording unit, and control means having input means for specifying one of the stimulable phosphor sheets and responsive to an output from the input means for controlling the circulatory feed means to pass the specified stimulable phosphor sheet through at least the image recording unit without recording radiation image information thereon.

A yet still further object of the present invention is to provide an apparatus for recording and reading out radiation image information, comprising circulatory feed means for feeding stimulable phosphor sheets each capable of recording radiation image information along a predetermined circulatory feed path, an image recording unit disposed in the circulatory feed path for exposing the stimulable phosphor sheets to a radiation from a radiation source through an object to record the radiation image information of the object on the stimulable phosphor sheets, an image readout unit disposed in the circulatory feed path and having a stimulating light source for emitting stimulating light to scan the stimulable phosphor sheets with the radiation image information recorded thereon and photoelectric readout means for detecting light emitted from the stimulable phosphor sheets scanned by the stimulating light to produce image signals, an image erase unit disposed in the circulatory feed path for discharging remaining radiation energy from the stimulable phosphor sheets after the images have been read therefrom by the image readout unit and before new radiation images are recorded on the stimulable phosphor sheets by the image recording unit, selecting means for selecting the amount of the radiation from the radiation source, memory means for specifying and storing the frequency of erasing the remaining radiation energy from the stimulable phosphor sheets in the image erase unit based on the image signals from the photoelectric readout means, position sensor means disposed at intervals along the circulatory feed means for detecting the positions of the stimulable phosphor sheets, and control means responsive to output signals from the position sensor means and output signals from the memory means for passing the stimulable phosphor sheets through the image recording and readout units without recording radiation image information thereon and reading radiation image information therefrom.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 5A through 5E are flowcharts of operation of the control circuit of FIG. 4 for feeding a stimulable phosphor sheet;

FIGS. 7A through 7C are diagrams of memories for storing block positions, sheet numbers, erasure frequencies, and other data on respective tables.

DESCRIPTION OF THE PREFERRED EMBODIMENTS

Figure 1:
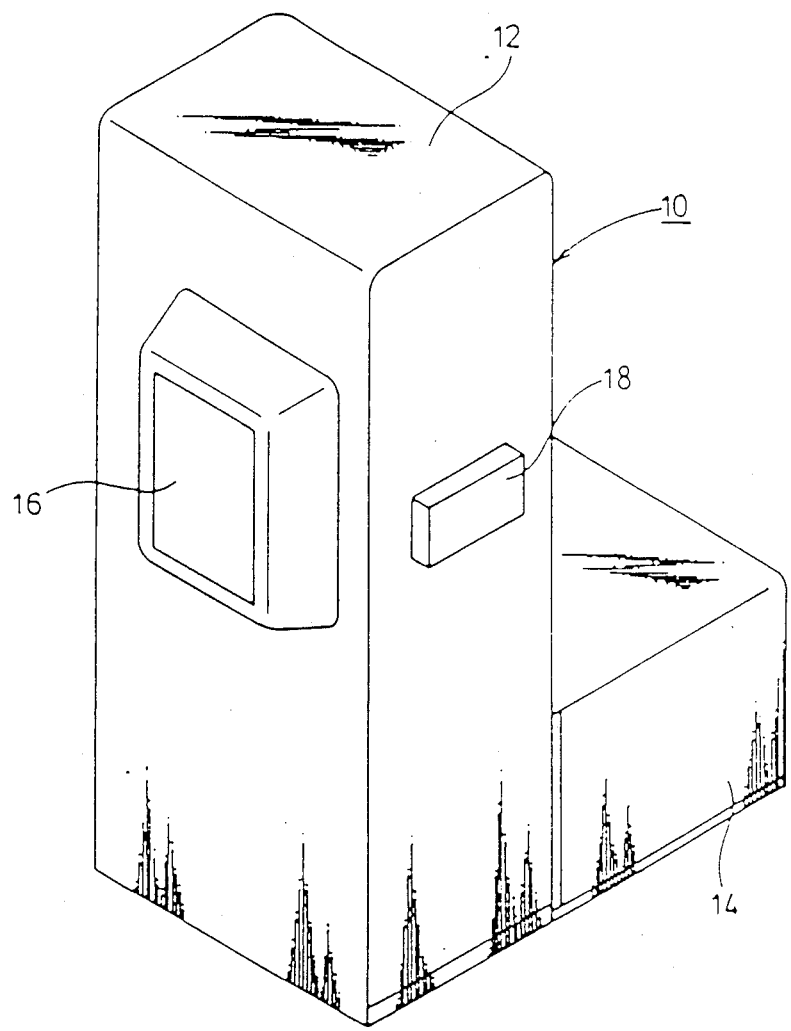
FIG. 1 is a perspective view of an apparatus for recording and reading out radiation image information according to the present invention.

The reference numeral 10 in FIG. 1 denotes an upstanding or chest-type radiation image recording and readout apparatus including a first vertical housing 12 and a second horizontal housing 14. The first housing 12 supports an exposure unit or image recording unit 16 on a front upper portion thereof and a control unit 18 on a side upper wall thereof.

Figure 2:
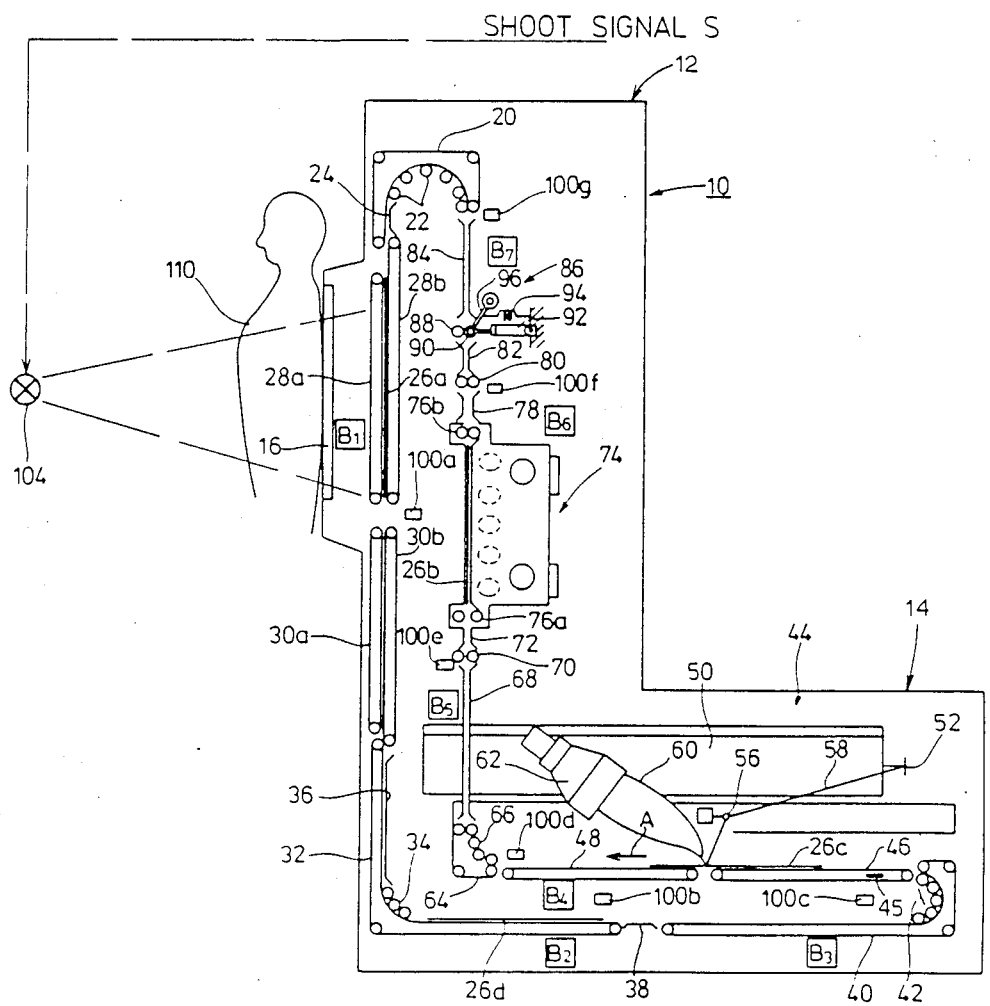
FIG. 2 is a schematic vertical cross-sectional view of the apparatus shown in FIG. 1.

The arrangements in the first and second housings 12, 14 will be described with reference to FIG. 2. A bent belt conveyor 20 is disposed in the top of the first housing 12. A first roller group 22 is rotatably held against the bent portion of the curved belt conveyor 20. A first guide member 24 is positioned adjacent to the first roller group 22. Within the image recording unit 16, there is disposed a pair of horizontally displaceable belt conveyors 28a, 28b for gripping and positioning a stimulable phosphor sheet 26. A pair of belt conveyors 30a, 30b is disposed below the outlet ends of the belt conveyors 28a, 28b, the belt conveyor 30b extending downwardly slightly beyond the belt conveyor 30a. A bent belt conveyor 32 is disposed below the belt conveyors 30a, 30b, with a second roller group 34 being positioned against the bent portion of the belt conveyor 32. A second guide member 36 is located above the second roller group 34 adjacent to the belt conveyor 32. A bent belt conveyor 40 extends from the outlet end of the belt conveyor 32 with a guide member 38 interposed therebetween. A third roller group 42 is rotatably held against the bent portion of the belt conveyor 40. An image readout unit 44 includes two belt conveyors 46, 48 arranged in series relation to each other, and a laser beam source 50 disposed above the belt conveyors 46, 48. A sensor 45 is disposed near the belt conveyor 46 for reading a bar code attached to each stimulable phosphor sheet and indicative of the identification number of the sheet. An output laser beam 58 emitted from the laser beam source 50 is directed by a mirror 52 and a galvanometer mirror 56 to transversely scan the stimulable phosphor sheet 26 placed on the belt conveyors 46, 48. When the galvanometer mirror 56 reciprocates, the laser beam 58 scans the stimulable phosphor sheet 26 with a radiation image recorded thereon (primary scanning). After a radiation image has been recorded on the stimulable phosphor sheet 26, the sheet 26 is fed to the image readout unit 44 by a sheet circulatory feed means. The image readout unit 44 also includes a light guide 60 positioned above the sheet 26 where it is scanned by the laser beam 58, the light guide 60 extending along the primary scanning direction. Light emitted from the sheet 26 upon exposure to the laser beam 58 enters the light guide 60 through its inlet end and then is guided thereby through total reflection therein. The light is then detected by a photomultiplier 62 connected to the outlet end of the light guide 60 and is photoelectrically detected thereby. At the same time that the sheet 26 is scanned by the laser beam 58 in the primary scanning mode, the sheet 26 is fed (secondary scanning) by the belt conveyors 46, 48 in the direction of the arrow A which is substantially normal to the primary scanning direction. Therefore, the sheet 26 is two-dimensionally scanned by the laser beam 58 to enable the photomultiplier 62 to read the stored radiation image information from the entire surface of the sheet 26. The image signal detected by the photomultiplier 62 is fed through an image signal input/output circuit 117 (FIG. 3) to an image processing device 116 which processes the image signal and delivers the processed image signal to a display unit 114 for reproducing the radiation image thereon. The radiation image may otherwise be recorded on a photosensitive film by light scanning or temporarily be recorded on a recording medium such as a magnetic tape.

Another bent belt conveyor 64 is disposed closely to the outlet end of the belt conveyor 48, and a fourth roller group 66 is rotatably held against the bent portion of the belt conveyor 64. The fourth roller group 66 and the outlet end of the belt conveyor 64 are followed by third guide members 68 above which nip rollers 70 are disposed. Fourth guide members 72 are located on the outlet ends of the nip rollers 70 and have outlet ends positioned near an image erase unit 74. The image erase unit 74 includes nip rollers 76a housed in a casing on one end thereof and nip rollers 76b housed in a casing on the other end thereof. The nip rollers 76b have outlet ends facing fifth guide members 78 with their outlet ends disposed in confronting relation to nip rollers 80. The nip rollers 80 are located closely to sixth guide members 82 having a length substantially equal to that of the fifth guide members 78. The sixth guide members 82 are disposed closely to relatively long seventh guide members 84 located in confronting relation to the first bent belt conveyor 20.

Between the sixth guide members 82 and the seventh guide members 84, there is positioned a cleaning unit 86 composed of a driving roller 88, a cleaning roller 90 pressed against the driving roller 88, a solenoid 92 for displacing the cleaning roller 90, and a coil spring 94 for normally pulling the cleaning roller 90. The solenoid 92 and the coil spring 94 have ends fixed to an angularly movable arm 96 and supporting the cleaning roller 90. The surface of the cleaning roller 90 is covered with a cleaning member (not shown) of felt, velvet, fur, or the like as disclosed in Japanese Patent Application No. 59-138740 filed by the present applicant.

The apparatus of the invention has position sensors located in prescribed positions for detecting the positions of a plurality of stimulable phosphor sheets 26a through 26d which are cyclically fed by the belt conveyors.

Specifically, a first position sensor 100a is disposed adjacent to the space between the belt conveyors 28a, 28b and the belt conveyors 30a, 30b. A second position sensor 100b is located in the vicinity of the terminal end of the bent belt conveyor 32. A third position sensor 100c is located immediately before the bent portion of the belt conveyor 40 which follows the belt conveyor 32. A fourth position sensor 100d is positioned near the terminal end of the horizontal belt conveyor 48. A fifth position sensor 100e is located near the space between the guide members 68 and the nip rollers 70. A sixth position sensor 100f is positioned closely to the space between the guide members 78 and the nip rollers 80, and a seventh position sensor 100g is positioned closely to the space between the guide members 84 and the belt conveyor 20.

Figure 3:
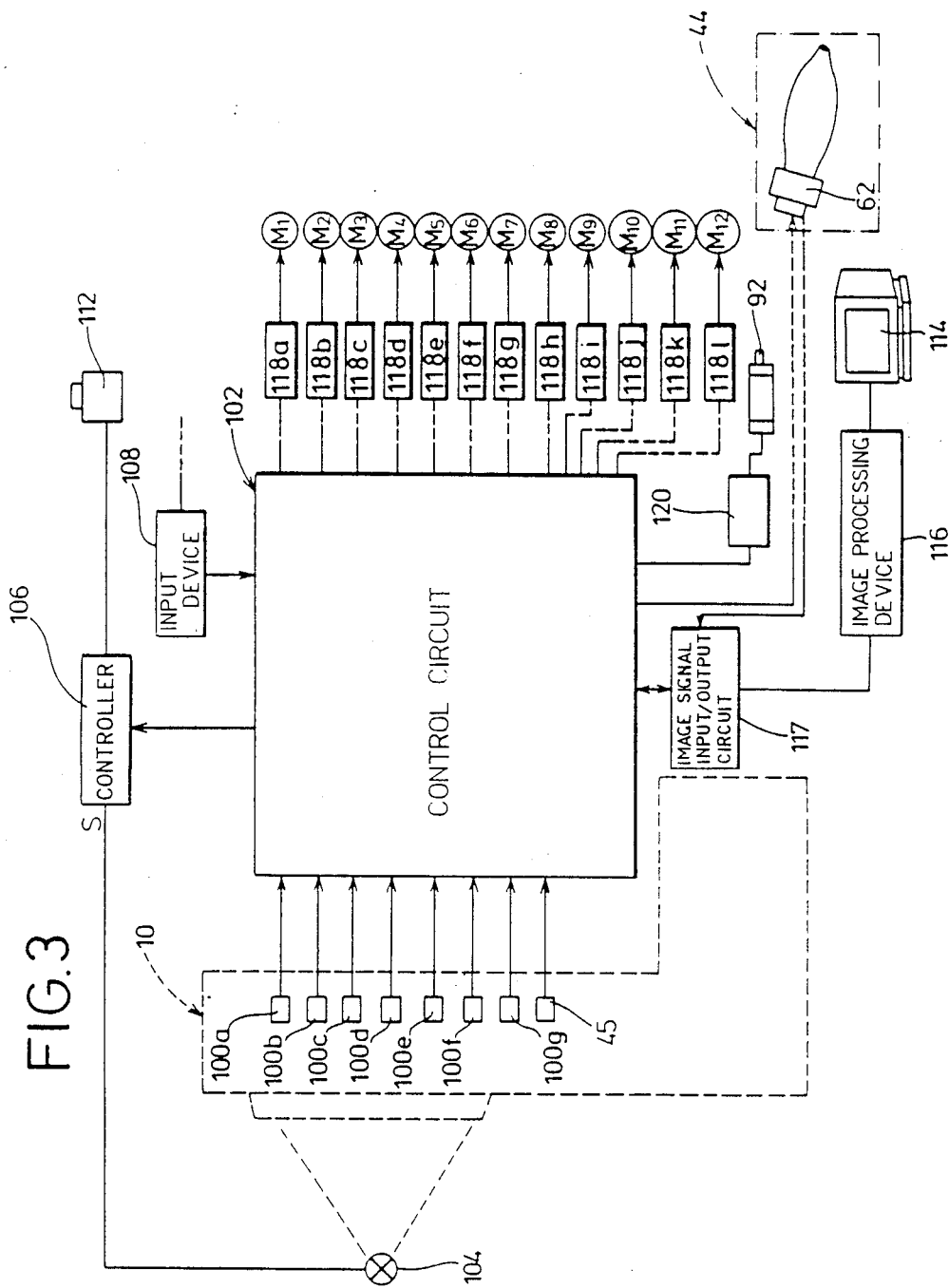
FIG. 3 is a block diagram of a control system for the apparatus of FIG. 1.

A control circuit responsive to the position signals from the position sensors 100a through 100g for actuating and stopping the belt conveyors will be described below with reference to FIG. 3.

The position sensors 100a through 100g have output terminals connected to a control circuit 102 comprising a microcomputer. To the control circuit 102, there are also connected an input device 108 and a controller 106 which is coupled to a switch 112 operable by the operator to enable a radiation source 104 to emit a radiation toward an object 110 (FIG. 2). The sensor 45 for reading the bar code on each stimulable phosphor sheet 26 has an output terminal connected to the control circuit 102.

An image signal input/output circuit 117 is also connected to the control circuit 102. A radiation image information signal which is detected by the photomultiplier 62 in the image readout unit 44 is applied through the image signal input/output circuit 117 to the image processing device 116. The radiation image information signal processed by the image processing device 116 is then applied to the display unit 114 which displays the radiation image on a real-time basis. The control circuit 102 has output terminals connected to drive circuits 118a through 118l for motors M1 through M12 which drive the belt conveyors 28b, 30b, 32, 40, 46, 48, 64, the nip rollers 70, 76a, 76b, 80, and the driving roller 88, respectively.

The control circuit 102 also has an output terminal coupled to the input terminal of the photomultiplier 62 for controlling the energization of the photomultiplier 62.

The control circuit 102 also has an output terminal connected to a circuit 120 for energizing the solenoid 92 to turn the arm 96 to press the cleaning roller 90 against the driving roller 88.

Figure 4:
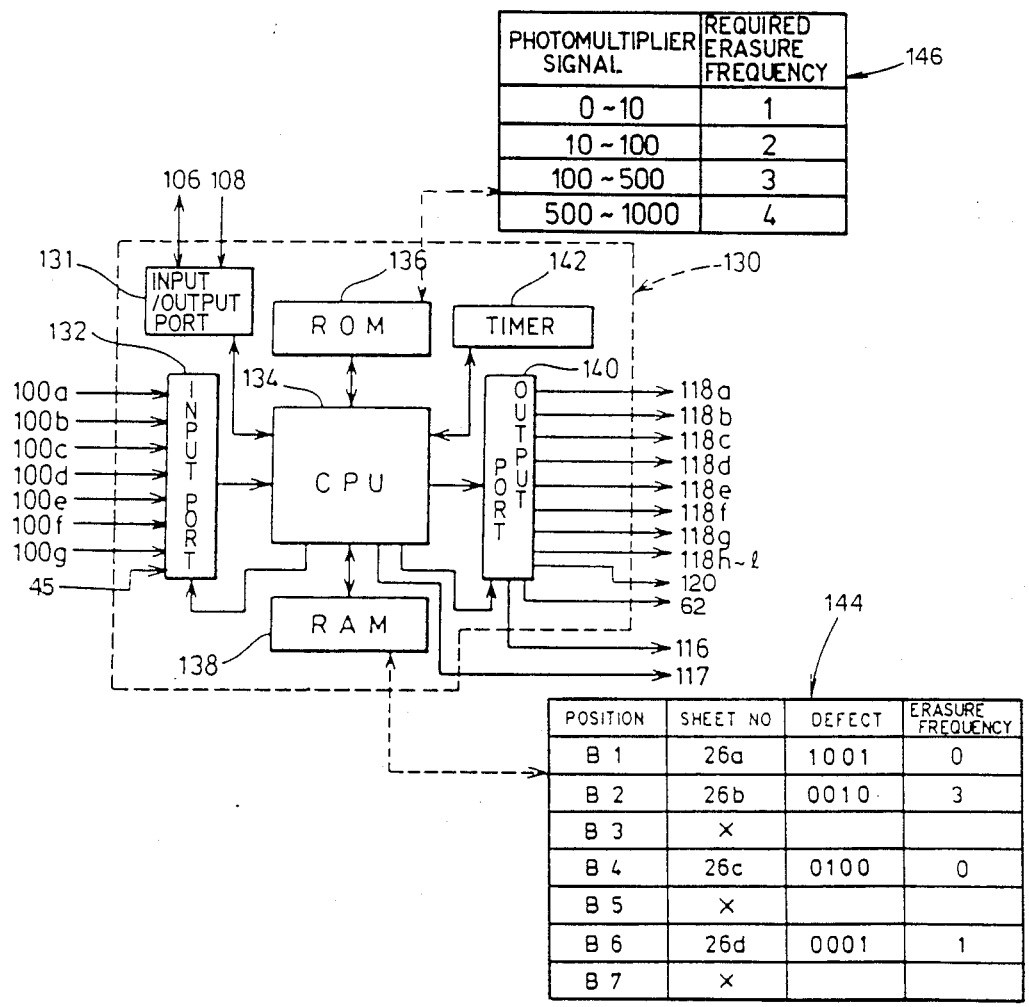
FIG. 4 is a block diagram of a control circuit in the control system shown in FIG. 3.

As shown in FIG. 4, the control circuit 102 comprises a microcomputer 130 of a known construction. The microcomputer 130 basically includes an input/output port 131, an input port 132, a CPU 134, a ROM 136, a RAM 138, an output port 140, and a timer 142. The input port 132 is supplied with the output signals from the position sensors 100a through 100g. The output port 140 issues control signals for energizing the drive circuits 118a through 118l to drive the motors M1 through M12, and also issues a control signal for energizing the circuit 120.

The position sensors 100a through 100g cover blocks B1 through B7, respectively, in the sheet feed system. The RAM 138 has a table 144 which stores block positions and sheet numbers that can be looked up by the CPU 134 when the stimulable phosphor sheets 26a through 26d are fed into the blocks B1 through B7, and which can store information indicative of whether each stimulable phosphor sheet contains a defect or not and also information representative of the frequency of erasure of any remaining image corresponding to the amount of a radiation emitted from the radiation source. The ROM 136 stores a program for controlling the CPU 134 so that when a stimulable phosphor sheet reaches a certain block, the stimulable phosphor sheet is kept in that block or fed to a next block, and also includes a data table 146 storing amounts of emitted light detected by the image readout unit 44, i.e., photomultiplier signals, and required image erasure frequencies dependent on the photomultiplier signals. More specifically, the data table 146 stores in different ranges the amounts of light emitted from the stimulable phosphor sheets and detected by the photomultiplier 62 and also stores the image erasure frequencies required by the detected signals from the photomultiplier 62 to be effected on the stimulable phosphor sheets. For example, if the amount of light emitted from a stimulable phosphor sheet is in the range of from 0 to 10, then the image erasure is effected on the stimulable phosphor sheet only once.

The necessary data can be stored in the data table 146 in the following manner: First, a stimulable phosphor sheet is uniformly exposed to a radiation. Then, the stimulable phosphor sheet is read by the image readout unit 44, i.e., the signal level (maximum level, for example) detected by the photomultiplier 62 is read. Thereafter, any remaining image is erased from the sheet by the image erase unit 74. The image erase unit 74 is arranged such that it will radiate a sufficient amount of light onto a stimulable phosphor sheet which has been exposed to a normal radiation to substantially thoroughly discharge the remaining radiation energy from the sheet to make the sheet reusable for image recording. Then, the sheet is read again by the image readout unit 44 to ascertain the level of the signal of any remaining image. If the signal level is sufficiently small, then the required image erasure frequency for the sheet is one. If the signal level is higher than a certain level, then the remaining image is erased again from the sheet in the image erase unit 74. The image erasing step is repeated until the signal level of the remaining image becomes sufficiently small. Therefore, it can be known from the signal level detected by the photomultiplier 62 how many times the stimulable phosphor sheet that has been exposed to a radiation image at the detected signal level should be subject to the image erasure step. The data table 146 in which the detected signals of the photomultiplier 62 and the corresponding required image erasure frequencies can experimentally be formed by changing the amount of radiation to which the stimulable phosphor sheet is to be exposed.

Operation of the apparatus for recording and reading out radiation image information will be described hereinbelow:

When a reusable stimulable phosphor sheet is left unused for a long period of time, a trace of remaining radiation image information on the sheet tends to emerge, or the energy of an environmental radiation is apt to be accumulated on the sheet, as noise with respect to new radiation image information to be recorded. According to the illustrated embodiment, the stimulable phosphor sheet is subject to a cleaning step for removing any cause of such noise and clearing dust or other foreign matter off the surface of the stimulable phosphor sheet. Then, it is determined whether there is any defect such as a scratch on the reusable stimulable phosphor sheet. If the reusable stimulable phosphor sheet has such a defect, the defect will be displayed on the display unit in superimposed relation to a radiation image of an object, and may prevent the radiation image from being properly displayed. To avoid such a problem, any stimulable phosphor sheet having such a defect is caused to skip the image recording, readout, and erasing steps according to the present invention. Sometimes, a special radiation image of an object is taken by exposing the object to a larger amount of radiation than normal, and hence the energy of such a radiation image stored in a stimulable phosphor sheet is extremely increased. According to the present invention, the stimulable phosphor sheet bearing an increased amount of radiation energy is subject to the image erasing step as many times as required dependent on the amount of stored energy. The above steps will be described below with reference to FIGS. 5A through 5E.

The apparatus 10 is started by pressing a starting switch (not shown). The belt conveyors and nip rollers of the sheet feed system are operated at a constant speed, and at the same time the table 144 in the RAM 138 is initialized and the image recording unit 16, the image readout unit 44, and the image erase unit 74 are actuated. As a result, four stimulable phosphor sheets 26a (referred to as "IP" in the flowcharts of FIGS. 5A through 5E) through 26d are fed in a circulatory manner. The stimulable phosphor sheets 26a through 26d can be detected by the position sensors 100a through 100g in the sheet feed system.

As described above, the apparatus 10 has the blocks B1 through B7 corresponding to the position sensors 100a through 100g, respectively. More specifically, the position information of the stimulable phosphor sheet in the block B1 is detected when the sheet is fed past the position sensor 100g. The positional information of the stimulable phosphor sheet in the block B2 is detected by the position sensor 100a. The positional information of the stimulable phosphor sheet in the block B3 is detected by the position sensor 100b. The positional information of the stimulable phosphor sheet in the block B4 is detected by the position sensor 100c. The positional information of the stimulable phosphor sheet in the block B5 is detected by the position sensor 100d. The positional information of the stimulable phosphor sheet as it emerges from the erase unit 74, or in the block B6, is detected by the position sensor 100e. Finally, the positional information of the stimulable phosphor sheet in the block B7 is detected by the position sensor 100f.

Noise resulting from any trace of a remaining radiation image which tends to emerge on a stimulable phosphor sheet when the apparatus 10 is restarted after it has been at rest for a long time can be eliminated by the erase step, and any dust or foreign matter on the sheet can be removed by a cleaning step. As the apparatus 10 is started by the starting switch, the sheet feed system is operated and it is determined whether there is a stimulable phosphor sheet in the block B5 immediately before the erase unit 74. At this time, the count of a register (counter) in the control circuit 102, i.e., the computer 130, is set to N=0, in a step 1 (FIG. 5A), which indicates that no stimulable phosphor sheet is fed from the erase unit 74 based on the output signal from the position sensor 100f. Then, it is determined whether there is a stimulable phosphor sheet in the block B5 in a step 2. If no stimulable phosphor sheet is in the block B5, then it is determined whether there is a stimulable phosphor sheet in the block B6 in a step 3. If a stimulable phosphor sheet is in the block B5, then it is determined whether there is a stimulable phosphor sheet in the block B6 in a step 4. If no stimulable phosphor sheet is in the block B6, the stimulable phosphor sheet is fed from the block B5 to the block B6 in a step 5. Data in the block B5 is transferred to the block B6 in a step 6. The timer 142 set to a time for irradiating erasing light in the erase unit 74 in a step 7. When the set time has elapsed in a step 8, then it is determined whether there is a stimulable phosphor sheet in the block B7 in a step 9. If no stimulable phosphor sheet in the block B7, then the CPU 134 applies an energization signal through the output port 140 to the solenoid 92. The solenoid 92 is energized to press the cleaning roller 90 against the roller 88 against the tensioning force of the coil spring 94 in a step 10. The stimulable phosphor sheet is now fed from the block B6 to the block B7 in a step 11. Data in the block B6 is transferred to the block B7 in a step 12.

Then, the computer 130 ascertains whether the erase step has been carried out four times or not in a step 13. If not, then it is determined again whether there is a stimulable phosphor sheet in the block B7 in a step 14. If there is a stimulable phosphor sheet in the block B7, then a step 15 ascertains if there is a stimulable phosphor sheet in the block B1. Only if no stimulable phosphor sheet in the block B1, the stimulable phosphor sheet is fed from the block B7 to the block B1 in a step 16, and data in the block B7 is transferred to the block B1 in a step 17. Thereafter, the solenoid 92 is de-energized to inactivate the cleaning roller 90 in a step 18. Specifically, the cleaning roller 90 is moved away from the driving roller 88 under the force of the coil spring 94.

Figure 5A:
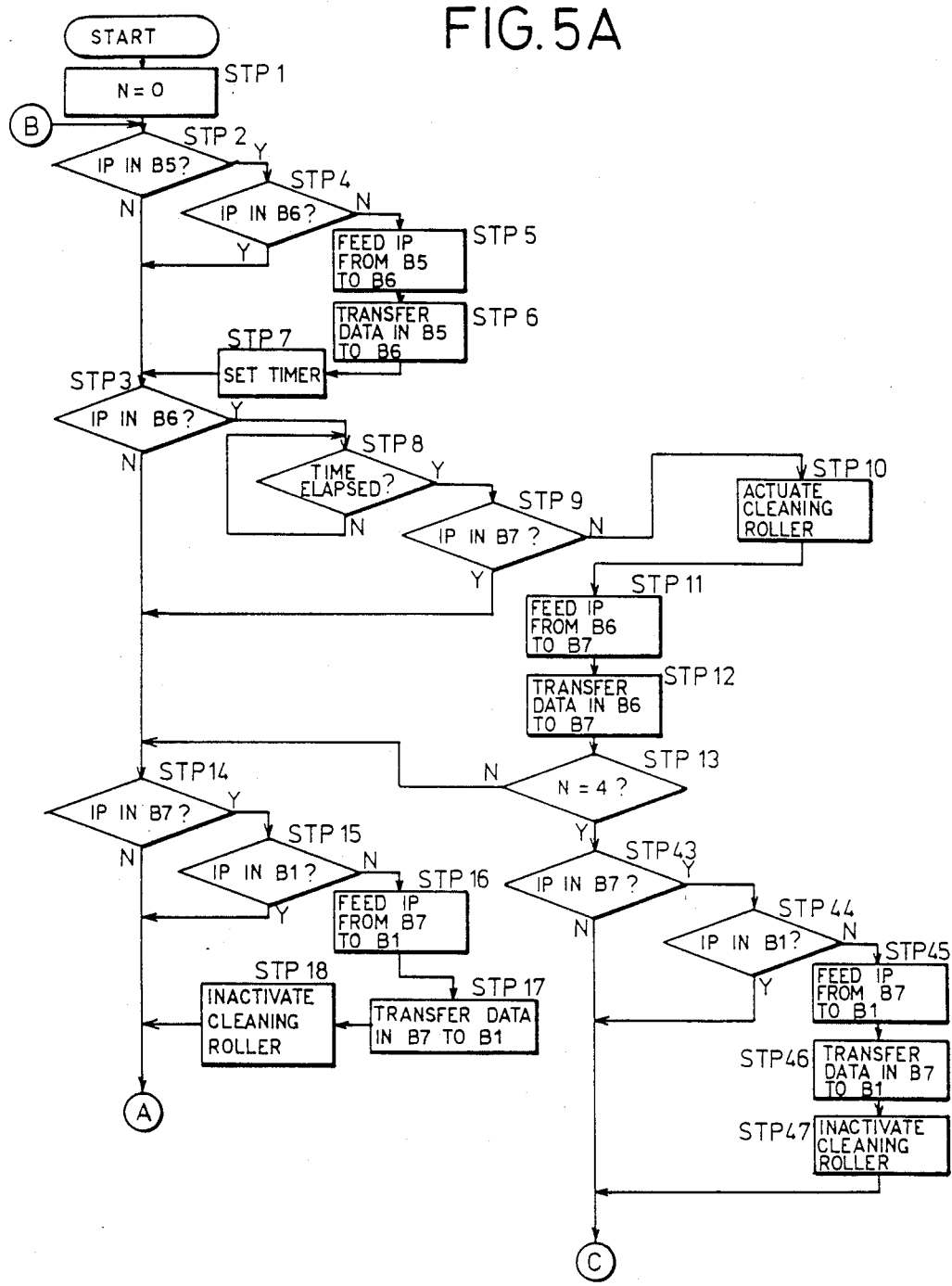
Figure 5B:
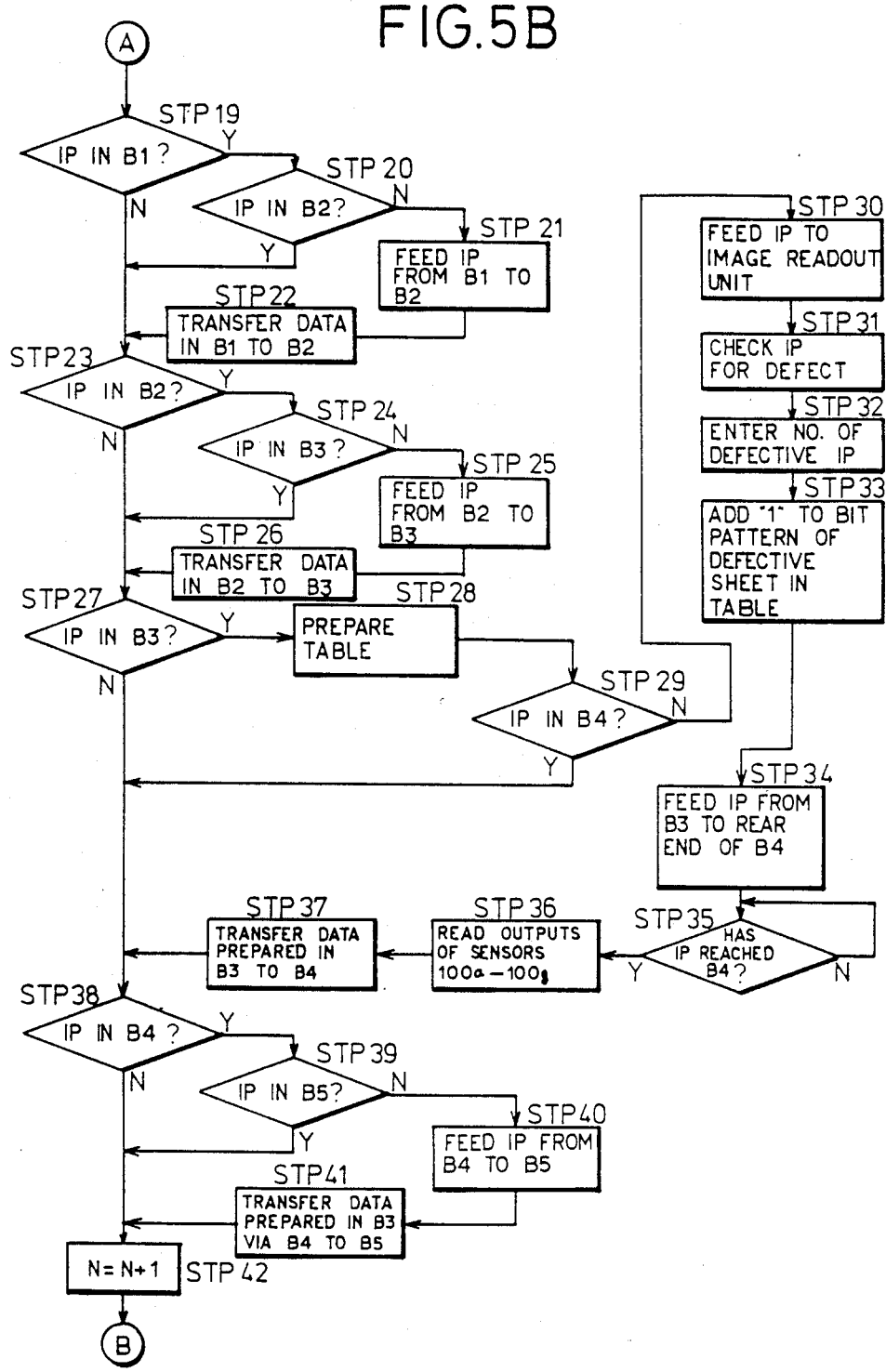
Figure 5C:
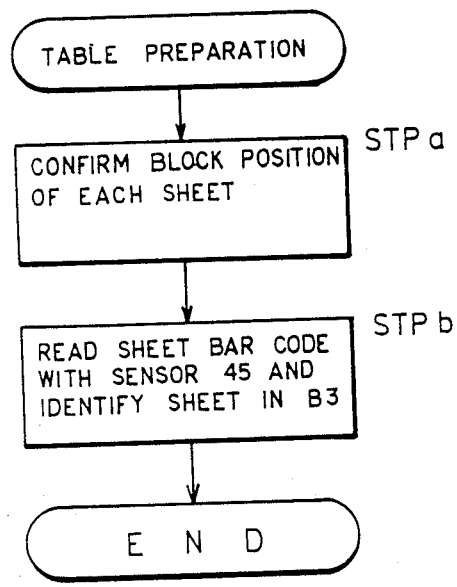

Then, it is determined whether there is a stimulable phosphor sheet in the block B1 in a step 19 (FIG. 5B). If there is, then a step 20 ascertains whether there is a stimulable phosphor sheet in the block B2. If no stimulable phosphor sheet in the block B2, then the computer 130 applies an output signal via the output port 140 to the motor driving circuit 118a to feed the stimulable phosphor sheet from the block B1 to the block B2 in a step 21. At this time, data in the block B1 is transferred to the block B2 in a step 22. If there is no stimulable phosphor sheet in the block B1 and there is a stimulable phosphor sheet in the block B2 in a step 23, it is determined whether there is a stimulable phosphor sheet in the block B3 in a step 24. If not, the stimulable phosphor sheet is fed from the block B2 to the block B3 in a step 25. Data in the block B2 is transferred to the block B3 in a step 26. If there is no stimulable phosphor sheet in the block B2 in the step 23 or there is a stimulable phosphor sheet in the block B3 in the step 24, then a step 27 ascertains again if there is a stimulable phosphor sheet in the block B3, then the program enters a table preparation routine in a step 28.

The program preparation routine is employed to specify the correlationship between the blocks and stimulable phosphor sheets therein as shown in FIG. 4. More specifically, the block position of each stimulable phosphor sheet is confirmed in a step a. Then, the sensor 45 in the image readout unit 44 reads out the bar code on the reverse side of each stimulable phosphor sheet to identify the stimulable phosphor sheet among the four sheets which is located in the block B3, and the sheet identifying information is stored in the table 144 in a step b. In the flowchart described thus far with respect to FIGS. 5A and 5B, the sheet positions and sheet numbers have not been obtained as data, and no substantial data has been transferred. However, upon completion of the table preparation routine, the data transfer becomes effective. If data has been prepared and held while the apparatus is inoperative, the table preparation routine will not be necessary, and the data transfer is effective from the step 6.

After the table preparation routine, the program returns to the main routine in FIG. 5B. A step 29 ascertains whether there is a stimulable phosphor sheet in the block B4. If not, then the stimulable phosphor sheet is fed from the block B3 to the image readout unit 44 in a step 30. Specifically, the motor M4 for the belt conveyor 40. the motor M5 for the belt conveyor 46, and the motor M6 for the belt conveyor 48 are energized by output signals from the output port 140. The image readout unit 44 is energized to irradiate the stimulable phosphor sheet with stimulating light 58. If the stimulable phosphor sheet has any defect such as a scratch, light is emitted from the scratched portion of the sheet. The emitted light is transmitted by the light guide 60 and photoelectrically converted by the photomultiplier 62 to an electric signal which is displayed on the CRT 114. When a defect is confirmed on the stimulable phosphor sheet in a step 31, the operator enters the sheet number through the input device 108 in a step 32. "1" is added to the bit pattern of the defective sheet in the table 144 in a step 33, thus producing information which indicates the defect on the stimulable phosphor sheet in the table 144. When the stimulable phosphor sheet as which has been checked for any defect is fed from the block B3 to the rear end of the block B4 in a step 34, it is determined whether the stimulable phosphor sheet has reached the block B4 in a step 35. If the sheet has reached the block B4, then the output signals from the position sensors 100a through 100g are read in a step 36, and "1" is added to each address in the table 144 and data substantially prepared in the block B3 is transferred to the block B4 in a step 37. Then, a step 38 ascertains if there is a stimulable phosphor sheet in the block B4. If there is, then it is determined whether there is a stimulable phosphor sheet in the block B5 in a step 39. If no stimulable phosphor sheet is in the block B5, then the stimulable phosphor sheet is fed from the block B4 to the block B5 in a step 40. The data prepared in the block B3 is transferred via the block B4 to the data area for the block B5 in a step 41.

Then, the computer 130 confirms that the first stimulable phosphor sheet among the four stimulable phosphor sheets has been subject to the erase step once, and stores the data in the RAM 138 in a step 42, from which the program goes back to the step 2.

The register in the microcomputer 130 counts stimulable phosphor sheets subject to the erase step in the step 13, as described above. If the number of the stimulable phosphor sheets subject to the erase step reaches "4", then a step 43 ascertains whether there is a stimulable phosphor sheet in the block B7. If there is, then it is determined again whether there is a stimulable phosphor sheet in the block B1 in a step 44. If there is no stimulable phosphor sheet in the block B1, then the stimulable phosphor sheet is fed from the block B7 to the block B1 in a step 45, and data in the block B7 is transferred to the block B1 in a step 46. Then, the solenoid 92 is de-energized to inactivate the cleaning roller 90 by moving the same away from the driving roller 88 in a step 47.

As illustrated in FIG. 5D, a step 48 then determines whether there is a stimulable phosphor sheet in the block B1. If there is, then the microcomputer 130 ascertains, based on the output signal from the position sensor 100b, whether there is a stimulable phosphor sheet in the block B2 in a step 49. If there is no stimulable phosphor sheet in the block B2, then a step 50 ascertains if the stimulable phosphor sheet in the block B1 is defective or not. If defective, no radiation image is recorded on the sheet, and the sheet is fed from the block B1 to the block B2 in a step 51. Specifically, the CPU 134 finds a defective stimulable phosphor sheet from the sheet numbers stored in the table 144, and, when the defective stimulable phosphor sheet is in the block B1, does not irradiate the sheet. If the stimulable phosphor sheet is not defective in the step 50, then a step 52 ascertains whether the frequency to erase any remaining image from the sheet in the block B1 is zero or not. If zero, then the apparatus 10 is readied, and the amount of a radiation to be emitted is selected dependent on the area of the object to be imaged in a step 53. The readiness condition of the apparatus 10 is displayed on the CRT 114. Having confirmed the readiness condition of the apparatus 10, the operator depresses the switch 112 to emit the radiation or X-ray. If the X-ray ray is emitted in a step 54, the readiness condition of the apparatus 10 is canceled in a step 55 to prevent a next cycle of X-ray emission. Then, the stimulable phosphor sheet is fed from the block B1 to the block B2 in the step 51. At this time, the data prepared in the block B3 is transferred via the block B1 to the block B2 in a step 56. If no X-ray is emitted in the step 48, the stimulable phosphor sheet remains as it is and the program proceeds to a next step.

Figure 5E:
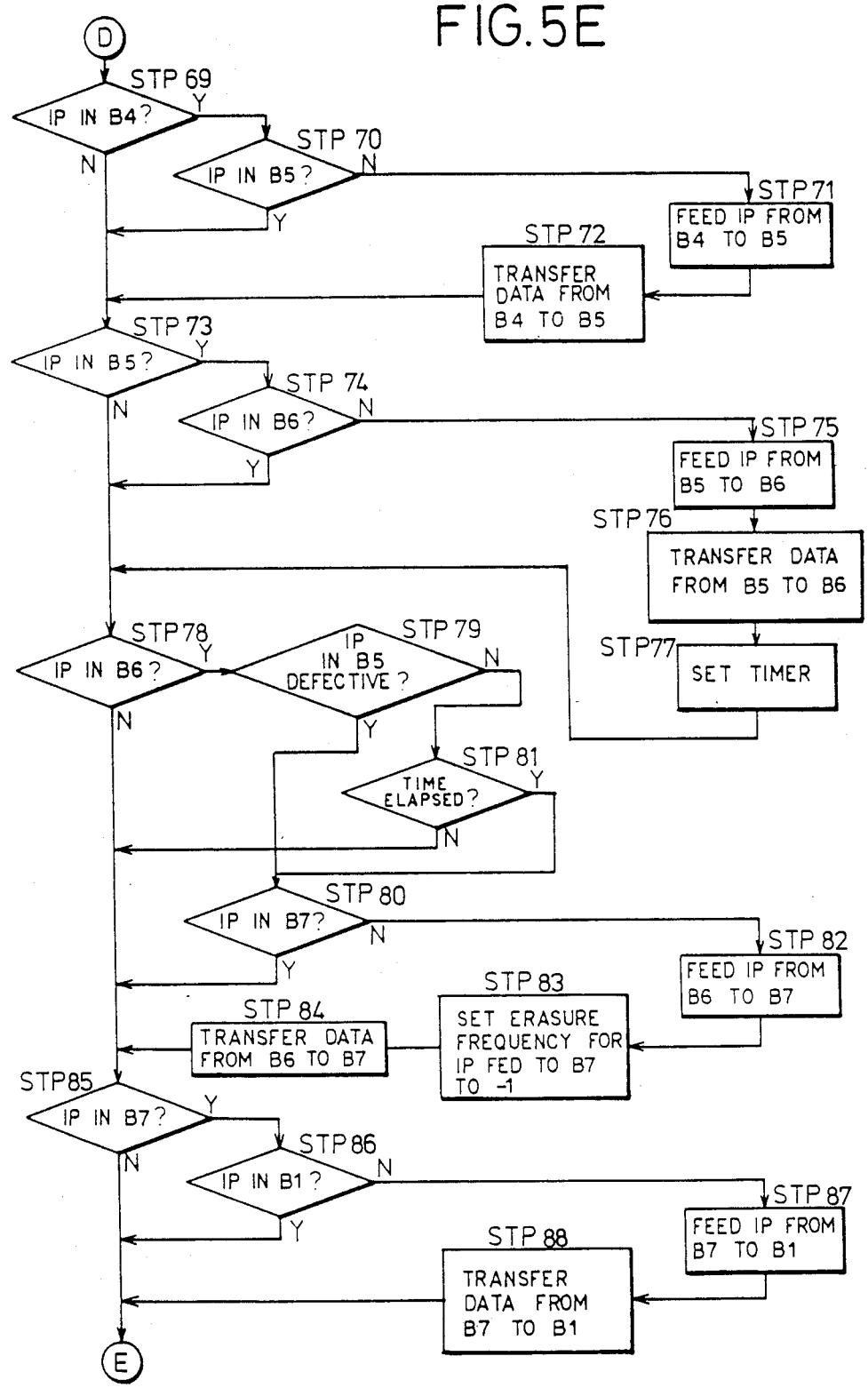

Whether there is a stimulable phosphor sheet in the block B2 can be determined by the output signal from the position sensor 100b. If there is a stimulable phosphor sheet in the block B2 in a step 57, and also there is no stimulable phosphor sheet in the block B3 in a step 58 as detected from the output signal from the position sensor 100c, then the stimulable phosphor sheet is fed from the block B2 to the block B3 in a step 59. At this time, the data prepared in the block B3 is transferred through the block B2 again to the block B3 in a step 60. If the stimulable phosphor sheet is fed to and present in the block B3 in a step 61, a step 62 ascertains whether there is a stimulable phosphor sheet in the block B4 in a step 62 to allow the stimulable phosphor sheet to proceed from the block B3. Then, it is determined whether the sheet in the block B3 is defective or not in a step 63. If defective, then the sheet is rapidly fed from the block B3 to the rear end of the block B4 in a step 64. If the sheet in the block B3 is not defective, and also if the erasure frequency for the sheet in the block B3 is zero in a step 65, then the sheet is fed from the block B3 to the block B4 and the radiation image on the sheet is read out in a step 66. Then, the required erasure frequency is found in the table 146 from the maximum level of the detected signal from the photomultiplier 62, and the found erasure frequency is written on the table 144 in a step 67. Thereafter, the data in the block B3 is transferred to the data area for the block B4 in a step 68, from which the program goes to a step 69 (FIG. 5E). If the erasure frequency for the sheet in the block B3 is not zero in the step 65, then the program goes to the step 64.

If there is no stimulable phosphor sheet in the block B3 in the step 61, or there is a stimulable phosphor sheet in the block B4 in the step 62, then the program proceeds also to the step 69. If there is a stimulable phosphor sheet in the block B4 in the step 69, then a step 70 ascertains whether there is a stimulable phosphor sheet in the block B5. If there is a stimulable phosphor sheet in the block B5, no drive signal is issued from the microcomputer 130, i.e., the CPU 134 to the driving circuit 118f. If there is no stimulable phosphor sheet in the block B5, then the stimulable phosphor sheet is fed from the block B4 to the block B5 in a step 71. Data in the block B4 is transferred to the block B5 in a step 72. If there is a stimulable phosphor sheet in the block B5 in a step 73, then a step 74 ascertains whether there is a stimulable phosphor sheet in the block B6. If there is no stimulable phosphor sheet in the block B6, then the stimulable phosphor sheet is fed from the block B5 to the block B6 in a step 75, and the data produced in the block B3 is transferred via the data area for the block B5 to the data area for the block B6 in a step 76. Then, the timer 142 is set to a prescribed time by the CPU 134 in a step 77. Therefore, the erase unit 74 irradiate the stimulable phosphor sheet with erasing light to erase any remaining image within the time period set by the timer 142. If there is a stimulable phosphor sheet in the block B6 in a step 78, a step 79 ascertains whether the stimulable phosphor sheet in the block B6 is defective or not, and if defective, then a step 80 ascertains whether there is a stimulable phosphor sheet in the block B7. If the stimulable phosphor sheet in the block B6 is not defective, then the time set by the timer 142 elapses in a step 81, and then the step 80 is executed. If the set time has not elapsed in the step 81, then the program goes to a step 85.

If there is no stimulable phosphor sheet in the block B7 in the step 80, then the stimulable phosphor sheet is fed from the block B6 to the block B7 in a step 82. The erasure frequency for the sheet fed to the block B7 is set to "−1" in a step 83, and the data in the block B6 is transferred to the data area for the block B7 in a step 84.

If there is no stimulable phosphor sheet in the block B7 in the step 85, the program goes back to the step 48 for execution of the following steps. IF there is a stimulable phosphor sheet in the block B7 in the step 85, then a step 86 ascertains if there is a stimulable phosphor sheet in the block B1. The stimulable phosphor sheet is fed from the block B7 to the block B1 in a step 87 only if there is no stimulable phosphor sheet in the block B1, and the data prepared in the block B3 is transferred via the data area for the block B7 to the data area for the block B1 in a step 88. Then, the program goes back to the step 48 for repeating the same operation until the apparatus 10 is switched off.

In the foregoing embodiment, the data stored in the table 144 is transferred in the main routine of the microcomputer as the sheets are fed along. However, since the microcomputer performs other control, the data may be updated in a subroutine under the control of the timer 142 as shown in FIG. 6.

Figure 6:
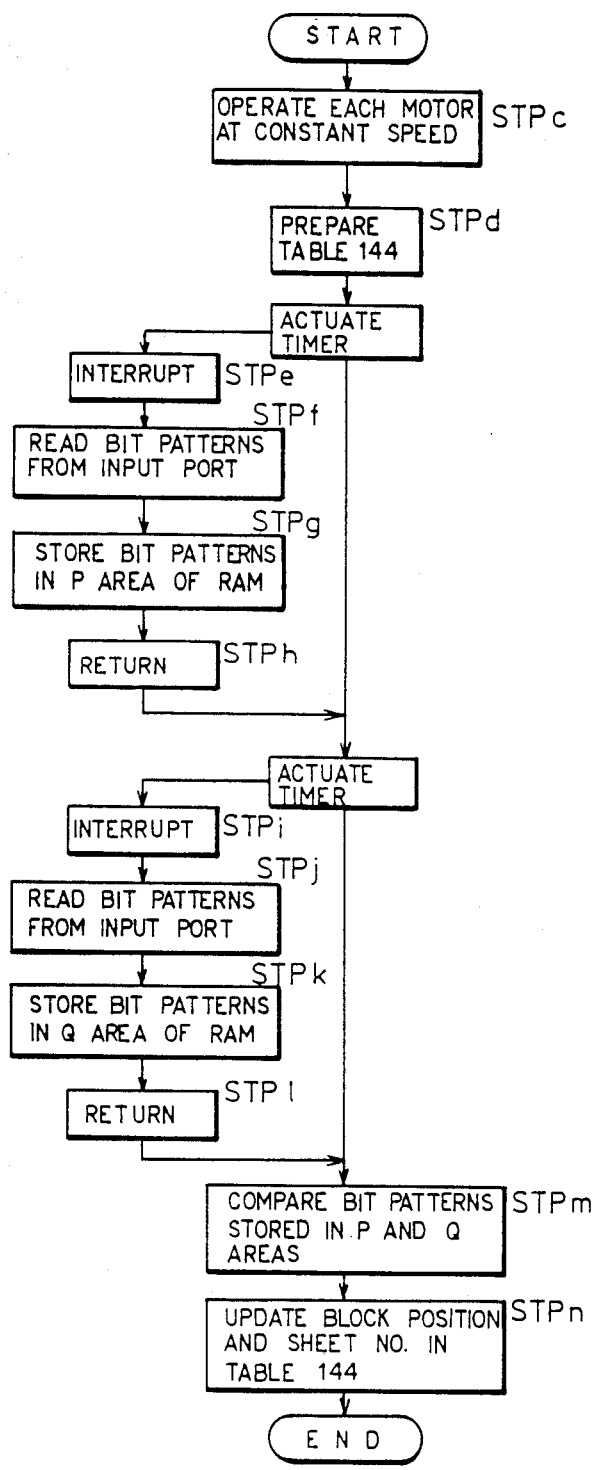
FIG. 6 is a flowchart showing a routine for updating the relative relationship of block positions and sheets.

In FIG. 6, the apparatus 10 is started by pressing the starting button (not shown). The motors for driving the belt conveyors and nip rollers of the sheet feed system are operated at a constant speed in a step c. At this time, the correlationship between the block positions and stimulable phosphor sheets therein is read and stored in the table 144, or the table 144 is prepared in a step d. The bar codes on the reverse sides of the stimulable phosphor sheets may be read by the image readout unit 44 to obtain information representative of the block positions and the sheet numbers, as described above.

With the apparatus 10 in operation, an interrupt routine is initiated in a step e by the timer 142. Then, a step f reads the bit patterns for the four stimulable phosphor sheets from the input port 132. The read bit patterns are stored in the P area of the RAM 138 in a step g in association with the block positions and the sheet numbers as shown in the table 144. When the bit patterns are stored in the RAM 138, the program returns to the main routine in a step h. The microcomputer 130 then controls, for example, the sheet feed system for feeding the stimulable phosphor sheets to the next belt conveyors.

Upon elapse of a prescribed period of time, an interrupt routine is executed again by the timer 142 in a step i. The bit patterns are read from the input port 132 in a step j, and stored in the Q area of the RAM 138 in a step k. The program then goes back to the main routine in a step 1. Thereafter, the bit patterns stored in the P area and the bit patterns stored in the Q area are compared in a step m, and the positional information of the stimulable phosphor sheets 26 in the table 144 is updated in a step n. In this manner, the identification numbers of the stimulable phosphor sheets 26 in the blocks B1 through B7 are specified with respect to their positions.

While in the above embodiment the data items about the sheet numbers, the defects, and the erasure frequencies are stored in the table 144 with respect to the block positions data, the positional information and the sheet numbers, the sheet numbers and the defects, and the sheet numbers and the erasure frequencies may be stored independently in respective tables 144a, 144b, 144c as shown in FIGS. 7A, 7B, and 7C, respectively, and any of these tables may selectively be employed.

In the apparatus 10 according to the present invention, stimulable phosphor sheets are cyclically and repeatedly fed through the image recording, readout, and erase units. The apparatus 10 is relatively compact in construction. Therefore, the apparatus is suitable for use on a motor vehicle. The apparatus 10 is capable of successively recording and reading radiation image information without interruption even if a stimulable phosphor sheet is scratched, contains a trace of remaining radiation image which would emerge as noise, and bears radiation energy of a high level.

A stimulable phosphor sheet having such a defect as to prevent a recorded radiation image from being properly displayed is skipped in the apparatus 10, and only those normal stimulable phosphor sheets which are free from defects are employed. Therefore, radiation image information of objects can efficiently be obtained while no defective radiation image information is produced. Where objects are human bodies, they can be protected against exposure to a useless radiation since defective stimulable phosphor sheets are not used.

In the illustrated embodiment, any defect on a sheet is found by the operator who watches a radiation image displayed on the display unit 114. However, the operator may find any defect by watching a radiation image reproduced on a recording medium by a processed image signal issued from the image processing device 116.

Any image is not recorded on a defective stimulable phosphor sheet in the image recording unit. Instead, the defective stimulable phosphor sheet is rapidly fed through the image readout unit and also fed through the erase unit without being allowed to remain therein for a prescribed erasure time. At this time, the galvanometer mirror 36 in the image readout unit may be stopped against its scanning movement and the photomultiplier 62 may be de-energized. However, it is more preferable to rapidly feed the defective sheet through the image readout unit which is kept in operation since the apparatus is not required to be stopped and started again. For the same reason, it is more preferable to feed the defective sheet rapidly through the erase unit with the erasing light source energized than to de-energize the erasing light source.

It is also possible to pass any defective stimulable phosphor sheet through the image recording unit without recording radiation image information thereon while keeping the image readout and erase units in normal operation to permit the defective stimulable phosphor sheet to be fed through the units in a circulatory manner.

The cleaning unit 86 may be disposed between the image readout unit 44 and the image erase unit 74.

Although a certain preferred embodiment has been shown and described, it should be understood that many changes and modifications may be made therein without departing from the scope of the appended claims.

What is claimed is:

1. A method of recording and reading out radiation image information, comprising the steps of:
    feeding stimulable phosphor sheets each capable of recording radiation image information along a predetermined circulatory feed path;
    exposing said stimulable phosphor sheets to a radiation through an object to record the radiation image information of the object on the stimulable phosphor sheets in an image recording unit in said circulatory feed path;
    reading out said radiation image information from said stimulable phosphor sheets in an image readout unit in said circulatory feed path;
    erasing any remaining image from said stimulable phosphor sheets in an image erase unit in said circulatory feed path; and
    exposing said stimulable phosphor sheets to stimulating light to detect any defect thereon before radiation image information is successively recorded on said stimulable phosphor sheets, and feeding those stimulable phosphor sheets which bear defects through said circulatory feed path while skipping said image recording, reading, and erasing steps.

2. An apparatus for recording and reading out radiation image information comprising:
    circulatory feed means for feeding stimulable phosphor sheets each capable of recording radiation image information along a predetermined circulatory feed path;
    an image recording unit disposed in said circulatory feed path exposing said stimulable phosphor sheets to radiation through an object to record the radiation image information of the object on said stimulable phosphor sheets;
    an image readout unit disposed in said circulatory feed path and having a stimulating light source for emitting stimulating light to scan said stimulable phosphor sheets with the radiation image information recorded thereon and photoelectric readout means for detecting light emitted from said stimulable phosphor sheets scanned by the stimulating light to produce image signals;
    an image erase unit disposed in said circulatory feed path for discharging remaining radiation energy from said stimulable phosphor sheets after the images have been read therefrom by said image readout unit and before new radiation images are recorded on said stimulable phosphor sheets by said image recording unit;
    means for detecting a defect on said stimulable phosphor sheets; and
    control means responsive to said means for detecting a defect to specify ones of said stimulable phosphor sheets having a defect thereon and to control said circulatory feed means to pass a specified one of said stimulable phosphor sheet through at least said image recording unit without recording radiation image information thereon.

3. An apparatus according to claim 2, wherein said control means controls said image readout unit to expose each of said stimulable phosphor sheets to stimulating light before radiation image information is recorded thereon, including display means for displaying light emitted from a defective one of said stimulable phosphor sheets exposed to such stimulating light, an input means being manually operable based on the light displayed on said display means for applying a signal to said control means to cause said defective stimulable phosphor sheet to skip operation of said image recording unit.

4. An apparatus according to claim 3, wherein said display means comprises a CRT.

5. An apparatus according to claim 3, wherein said control means includes memory means for storing data applied from said input means and indicative of the defective stimulable phosphor sheet.

6. An apparatus according to claim 5, wherein said control means is responsive to an output from said memory means for controlling said circulatory feed means to feed said defective stimulable phosphor sheet along said circulatory feed path while skipping operation of said image recording, readout, and erasing units.

7. An apparatus according to claim 2, further comprising sensing means located at positions along said circulatory feed means, for detecting the positions of said stimulable phosphor sheets within said circulatory feed means.

8. An apparatus according to claim 7, wherein said control means actuates and stops said circulatory feed means in response to signals from said sensing means.

* * * * *